United States Patent [19]

Tung et al.

[11] 4,377,988
[45] Mar. 29, 1983

[54] REFLECTIVE ANIMAL COLLAR AND MATERIAL FOR FORMING SUCH A COLLAR

[75] Inventors: Chi F. Tung, Mahtomedi; James C. Coderre, White Beak Lake; Chester A. Bacon, Jr., Oakdale, all of Minn.

[73] Assignee: Minnesota Mining and Manufacturing Company, Saint Paul, Minn.

[21] Appl. No.: 305,272

[22] Filed: Sep. 24, 1981

[51] Int. Cl.³ .................................................. A01K 27/00
[52] U.S. Cl. ..................................... 119/106; 350/98; 350/105
[58] Field of Search .................. 119/156, 106, 109; 350/105, 98, 97

[56] References Cited

U.S. PATENT DOCUMENTS 3,918,407  11/1975  Greenberg ........................ 119/156
4,091,766  5/1978  Colliard ............................. 119/106
4,192,576  3/1980  Tung et al. ........................ 350/105

Primary Examiner—Jay N. Eskovitz
Attorney, Agent, or Firm—C. Alexander; D. M. Sell; R. R. Tamte

[57] ABSTRACT

Reflective sheeting useful for application to a pesticide-impregnated animal collar, and animal collars made from the sheeting. The sheeting generally comprises a monolayer of transparent microspheres; specularly reflective material underlying the microspheres; a binder layer of polymeric binder material in which the microspheres are partially embedded; a carrier sheet stretchable about 10 percent or more before rupture, in which the portions of the microspheres protruding from the binder layer are embedded; a barrier layer underlying the binder layer, which sorbs plasticizers more slowly than the binder layer sorbs the plasticizers; and a layer of adhesive underlying the barrier layer.

12 Claims, 2 Drawing Figures

REFLECTIVE ANIMAL COLLAR AND MATERIAL FOR FORMING SUCH A COLLAR

BACKGROUND OF THE INVENTION

Retroreflective pesticide-impregnated animal collars have been desired but never achieved in a practicable and commercial product. U.S. Pat. No. 4,091,766 teaches an animal collar which includes on one side a lighttransmitting elongated flattened tube into which a reflective strip may be inserted and on the other side an absorbent material which may be impregnated with pesticide. Such a collar is elaborate, expensive and bulky, and so far as known is not presently used.

The present invention provides a much more simple and compact reflectorized pesticide-impregnated animal collar and accomplishes this result by adhering retroreflective sheeting directly to a pesticide-impregnated polymeric strip. This direct-adhesion approach required the overcoming of a number of obstacles. For one, pesticide impregnated in the polymeric strip acts as a plasticizer, which migrates out of the strip during use of the collar, and attacks components of the reflective sheeting. Particularly a polymeric binder layer in the reflective sheeting, in which transparent microspheres are supported, may be attacked and softened; and a specularly reflective aluminum coating underlying the microspheres may be corroded to a nonspecular condition.

Also manufacturing operations on the animal collar during and after lamination of the reflective sheeting to the polymeric strip apply stress to the reflective sheeting that in some cases can tear the sheeting and in other cases can cause the sheeting to wrinkle and delaminate from the polymeric strip.

Because of such difficulties, animal collars made by laminating prior-art reflective sheetings to pesticide-impregnated polymeric strips had a useful life of less than three weeks.

SUMMARY OF THE INVENTION

The present invention provides a new reflectorized pesticide-impregnated animal collar and a new reflective sheeting for use in the collar. Briefly, this new reflective sheeting comprises a monolayer of transparent microspheres; specularly reflective material underlying the microspheres; a binder layer of polymeric binder material in which the transparent microspheres are partially embedded; a stretchable carrier sheet in which the portions of the glass microspheres protruding from the binder layer are embedded; a barrier layer underlying the binder layer, which inhibits plasticizer migrations; and a layer of adhesive underlying the barrier layer.

The described sheeting can be directly adhered to a pesticide-impregnated polymeric strip, and the sheeting resists attack by pesticide from the polymeric strip, and counters other problems that occur in laminating the sheeting to the polymeric strip.

DETAILED DESCRIPTION

Figure 1:
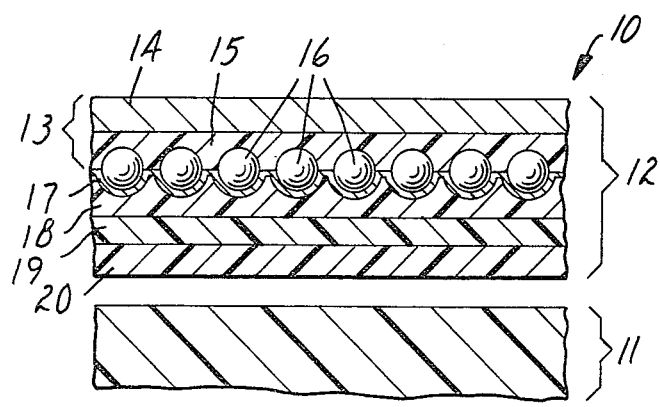
FIG. 1 is a sectional view of a representative reflective sheeting of the invention and pesticide-impregnated polymeric base strip from which an animal collar of the invention is made.

FIG. 1 is a sectional view through the components of an illustrative animal collar of the invention. This collar 10 comprises a base strip 11 of pesticide-impregnated polymeric material, and a reflective sheeting 12 which is laminated to the base strip to form the collar.

An illustrative material for forming the pesticide-impregnated base strip 11 is taught in U.S. Pat. No. 3,918,407. Typically the strip comprises a polymer based on vinyl chloride.

The illustrative reflective sheeting 12 shown in FIG. 1 includes a removable carrier about 13 which in this embodiment comprises a paper sheet 14 and a softenable layer 15 of a polymer such as polyethylene. Further included in the sheeting 12 are a monolayer of transparent microspheres 16, which protrude into the softenable layer 15 in the carrier sheet 13; a specularly reflective layer 17 underlying the microspheres; a binder layer 18 in which the microspheres are supported; a barrier layer 19; and a layer 20 of adhesive.

During typical manufacture of the reflective sheeting 12, the microspheres 16 are first embedded in the softenable layer 15 of the carrier sheet 13 in a manner as taught in U.S. Pat. No. 3,190,178 (the microspheres are presented to the moving polymer-coated carrier sheet while the carrier sheet is heated to tackify the softenable layer 15, and the softenable layer is then further heated to increase its softness and cause the microspheres to become embedded into the polymer). It is desirable that the microspheres 16 be sunk into the softenable layer 15 less than 50 percent of their diameter so that they will subsequently be embedded in the binder layer 18 to a depth greater than 50 percent and will be firmly held in the binder material. The microspheres are typically glass having an index of refraction of 1.85 to 2, unless the reflective sheeting includes a transparent top layer (i.e., a layer like the carrier sheet but which is a permanent part of the sheeting), in which case glass of an index of 2 or higher would be used and the specularly reflective layer would typically be spaced from the microspheres by a spacing layer, as is known in the art.

After the microspheres have been embedded in the softenable layer 15 of the carrier sheet, a specularly reflecting material 17 such as aluminum is coated on the microspheres as by vapor-deposition. The binder layer 18 is applied over the vapor-coated metal as by coating from solution or by extrusion, whereupon the binder layer will eventually serve to support the microspheres when the carrier sheet 13 is removed. A variety of binder materials can be used for the binder layer, although we prefer a binder material that comprises acrylonitrile-butadiene polymer (which typically reacts to an elastomer, i.e., a material that may be stretched at least twice its own length before rupturing and returns with force to subsequently its original length upon release of the stretching force), phenolic resin and plasticizer. For example, we have used a mixture comprising 55 weight-percent of a high-acrylonitrile acrylonitrile-butadiene rubber (Hycar 1001 supplied by B. F. Goodrich), 35 weight-percent of a thermosetting phenolic resin ("Durez" resin No. 175 supplied by Hooker Electrochemical Co.), and 10 percent of dioctylphthalate serving as a plasticizer. Such a binder material maintains good adhesion to the specularly reflective layer even in a heavily plasticized environment. It is also heat-resistant, washable, and compatible with useful barrier-layer materials, and maintains its elastomeric properties throughout the manufacturing process for the animal collar and for the useful life of the collar.

The barrier layer disposed under the binder layer comprises a membrane or film which is typically coated onto the binder layer and which sorbs plasticizers (i.e., liquid materials that may be included in a polymeric material and which may migrate out of the polymeric material, such as the plasticizers added to polyvinyl chloride as other vinyl-based polymers), more slowly than the binder layer sorbs the plasticizers, and which is less affected than the binder layer by the plasticizers. Moisture-curing polyester-polyurethanes provide an especially useful barrier layer. For example, the barrier layer may be provided by wet-extruding onto the binder layer a solution comprising 83 weight-percent methylene chloride, and 17 weight-percent of a moisture-curing polyester polyurethane prepared by reacting 7 parts of a polymeric isocyanate based on methylene diisocyanate (Mondur XP-744), 3 parts of an isocyanate-terminated prepolymer prepared by reacting methylene diisocyanate, diol and triol, and 9 parts of a thermoplastic saturated hydroxyl-functional polyester resin (Bostik 7966 supplied by USM Corporation) and then drying the composition at temperatures up to 250° F. (120° C.) to obtain a dry coating weight of approximately 3-7 grains per 4 inches by 6 inches (approximately 13-30 grams per square meter). Nonporosity is assisted by use of extrusion coating to minimize air entrapment and by use of closely controlled drying conditions to prevent blistering.

The adhesive layer is preferably coated or extruded directly onto the barrier layer to obtain the strongest bond to the barrier layer; but an adhesive layer can also be separately formed and laminated to the barrier layer. The adhesive material preferably is a heat-activated material which flows under heat and pressure to form a good bond to the base strip and then cools and in some cases reacts to develop a strong tough bond. A desirable heat-activated adhesive material comprises a 50:50 blend of a vinyl polymer such as a copolymer containing about 86 percent vinyl chloride ("Bakelite" VMCH-2 supplied by Union Carbide Plastics Co.), 13 percent vinyl acetate, and 1 percent maleic acid, and a thermoplastic polyurethane such as a polyester-polyurethane ("Estane" 5713 supplied by B. F. Goodrich). The ingredients are dissolved in common solvents, with a typical formulation being 46 weight-percent methyl ethyl ketone, 13.3 percent dimethyl formalide, 14.8 percent toluene, 12.7 percent polyurethane resin 5713 and 12.7 percent vinyl resin. A presently used coating method is to reverse-roll coat with a smoothing bar and dry at a temperature between 200°-350° F. (93°-177° C.) to attain a dry coating weight of 6-9 grains per 4 inches by 6 inches (27-39 grams per square meter). Other commonly known coating methods can be used, such as bar coating, and extrusion with or without solvent.

A release liner such as a 50-micrometer-thick polyethylene film is typically included to cover the adhesive layer, and may be heat-laminated to the adhesive. The liner (not shown in FIG. 1) is removed shortly before the reflective sheeting is to be applied to the base polymeric strip of the collar.

The completed reflective sheeting is laminated under heat and pressure to the base strip of the animal collar, typically in a stripe about 3 millimeters wide. The mixture of vinyl-based polymer and polyurethane in the heat-activated adhesive adheres well to a highly plasticized polyvinyl chloride substrate. The unplasticized vinyl chloride in the adhesive has the capacity to absorb pesticide or other plasticizer migrating out of the base strip and this absorption inhibits action of the pesticide or plasticizer on other portions of the reflective sheeting. The network of polyurethane in the adhesive provides a firm, yet flexible layer that will not flow upon absorption of plasticizer into the adhesive, and the adhesive maintains adhesion to both the barrier layer and base polymeric strip in spite of migration of pesticide or plasticizer.

After lamination of the reflective sheeting and base strip together, the laminate is cut to a length appropriate for a collar, and a buckle or other fastening means is attached. The resulting collar is wound into a tight roll for packing, and may be heat treated to anneal the base strip. The reflective sheeting is on the exterior of the windings in the roll, which results in application of significant tension to the reflective sheeting. The tension can produce tearing of the reflective sheeting, but it has been found that such tearing is inhibited by use of stretchable carrier sheet. For example, a carrier sheet comprising a base paper or film that may be stretched about 10 percent before rupture has provided good results. Carrier sheets that stretch 50 percent or more before breaking are preferred. If the paper breaks, it breaks in a gradual rather than abrupt manner, which appears to enhance stretching of the reflective sheeting without breaking. Carrier sheets in which the base sheet on which the softenable layer is coated comprises a strengthening polymeric film coated on paper or comprises simply a polymeric film are also useful.

Figure 2:
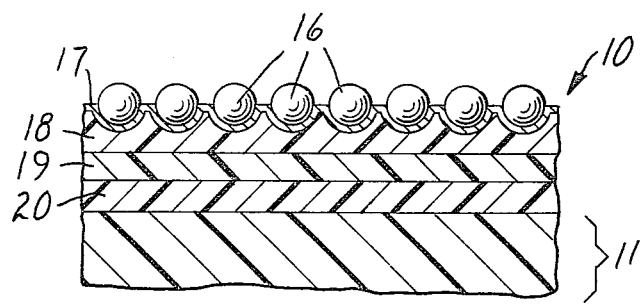
FIG. 2 is a sectional view through a completed animal collar of the invention.

The carrier sheet also acts as a protective layer during heat lamination of the sheeting to the base polymeric strip, by holding the microspheres in position while the adhesive layer of the sheeting is being softened. Also, the carrier sheet also inhibits deposition of pesticide material from the back side of the collar onto the front surface of the reflective sheeting during the heat-treatment operation. Such deposition of pesticide can limit the reflective properties of the reflective sheeting. After removal of the animal collar from a packaged roll, the user removes the carrier sheeting and the collar is ready for use, in the form as shown in FIG. 2.

What is claimed is:

1. Reflective sheeting useful for application to a pesticide-impregnated animal collar comprising
    a monolayer of transparent microspheres;
    specularly reflective material underlying the microspheres;
    a binder layer of polymeric binder material in which the microspheres are partially embedded;
    a carrier sheet stretchable about 10 percent or more before rupture, in which the portions of the microspheres protruding from the binder layer are embedded;
    a barrier layer underlying the binder layer, which sorbs plasticizers more slowly than the binder layer sorbs the plasticizers; and
    a layer of adhesive underlying the barrier layer.

2. Reflective sheeting of claim 1 in which the barrier layer comprises polyurethane.

3. Reflective sheeting of claim 1 in which the stretchable carrier sheet comprises a paper coated with polyethylene.

4. Reflective sheeting of claim 1 in which the carrier sheet comprises a polymeric film coated with polyethylene.

5. Reflective sheeting of claim 1 in which the layer of adhesive comprises a vinyl-based polymer.

6. Reflective sheeting of claim 1 in which the polymeric binder material comprises an acrylonitrile-butadiene polymer.

7. A reflective pesticide-impregnated animal collar comprising a pesticide-impregnated polymeric base strip and the reflective sheeting of claim 1 adhered to the base strip.

8. Reflective sheeting useful for application to a pesticide-impregnated animal collar comprising
   a monolayer of transparent microspheres;
   specularly reflective material underlying the microspheres;
   a binder layer of polymeric binder material comprising acrylonitrile-butadiene polymer and phenolic resin and in which the transparent microspheres are partially embedded;
   a carrier sheet comprising a base sheet that is stretchable at least 10 percent before rupture, and a polyethylene layer in which the portions of the transparent microspheres protruding from the binder layer are embedded;
   a polyurethane barrier layer underlying the binder layer; and
   a layer of vinyl-based heat-activated adhesive underlying the barrier layer.

9. Reflective sheeting of claim 8 in which the heat-activated adhesive further includes a thermoplastic polyurethane.

10. A reflective animal collar comprising a pesticide-impregnated polymeric base strip and a reflective sheeting adhered to the strip which comprises
    a monolayer of transparent microspheres;
    specularly reflective material underlying the microspheres;
    a binder layer of polymeric binder material in which the microspheres are partially embedded;
    a barrier layer underlying the binder layer, which sorbs plasticizers more slowly than the binder layer sorbs the plasticizers; and
    a layer of adhesive underlying the barrier layer by which the reflective sheeting is adhered to the polymeric strip.

11. A collar of claim 10 in which the barrier layer comprises polyurethane.

12. A collar of claim 10 in which the adhesive comprises a vinyl-based polymer.

* * * * *